(12) United States Patent
Fitzrandolph (10) Patent No.: US 6,757,324 B2
(45) Date of Patent: Jun. 29, 2004

(54) METHOD AND APPARATUS FOR DETECTING JAMMING SIGNAL

(75) Inventor: David K. Fitzrandolph, Phoenix, AZ (US)

(73) Assignee: Motorola, Inc., Schaumburg, IL (US)

( * ) Notice: Subject to any disclaimer, the term of this patent is extended or adjusted under 35 U.S.C. 154(b) by 225 days.

(21) Appl. No.: 10/198,847

(22) Filed: Jul. 18, 2002

(65) Prior Publication Data

US 2004/0013170 A1 Jan. 22, 2004

(51) Int. Cl.[7] .............................. H04B 1/69; H04K 3/00
(52) U.S. Cl. ...................... 375/147; 375/150; 375/371; 455/1
(58) Field of Search ................................. 375/140, 142, 375/143, 147, 150, 152, 224, 367, 371; 342/357.12, 442, 357.06; 455/456.1; 380/1, 42, 287, 255

(56) References Cited

U.S. PATENT DOCUMENTS

| | | | |
|---|---|---|---|
| 4,918,706 A | | 4/1990 | Phillips et al. |
| 5,083,111 A | * | 1/1992 | Drucker et al. .......... 340/572.1 |
| 5,295,151 A | | 3/1994 | Skudera, Jr. et al. |
| 5,363,401 A | | 11/1994 | Lucas et al. |
| 5,627,856 A | * | 5/1997 | Durrant et al. ............. 375/150 |
| 5,966,406 A | | 10/1999 | Hsieh et al. |
| 6,111,538 A | * | 8/2000 | Schuchman et al. ... 342/357.12 |
| 6,154,170 A | | 11/2000 | Dentinger et al. |
| 6,707,422 B2 | * | 3/2004 | Sheynblat et al. ..... 342/357.12 |

* cited by examiner

Primary Examiner—Jean B. Corrielus
Assistant Examiner—Qutubuddin Ghulamali
(74) Attorney, Agent, or Firm—Kevin D. Wills (57) ABSTRACT

In a wireless communication device (106) a method of detecting a narrowband jamming signal (404) includes receiving a wireless communication signal (104) and down-converting the wireless communication signal (104) to an intermediate frequency (IF) signal (525). IF signal (525) is digitized to provide a digital signal (527). Digital signal (527) is despread, demodulated and monitored for the number of phase transitions (562) occurring during a time interval (556). The method further includes comparing the number of phase transitions (562) during the time interval (556) with a threshold value (560) and determining that the wireless communication signal (104) is not the narrowband jamming signal (404) if the number of phase transitions (562) during the time interval (556) exceeds the threshold value (560), or determining that the wireless communication signal (104) is the narrowband jamming signal (404) if the number of phase transitions (562) during the time interval (556) is less than the threshold value (560).

29 Claims, 5 Drawing Sheets

METHOD AND APPARATUS FOR DETECTING JAMMING SIGNAL

BACKGROUND OF THE INVENTION

In Direct Sequence Spread Spectrum (DSSS) systems, it is possible for a high-powered, narrowband signal to jam a DSSS receiver. Due to the nature of the demodulating process in a DSSS receiver, a strong signal going into a despreader results in a strong signal coming out of the despreader. A receiver uses the despreader output downstream for two primary purposes: 1) to demodulate transmitted data, and 2) to determine the signal strength of the DSSS signal. If a high-powered narrowband signal enters the despreader, the high amplitude output of the despreader can deceive the receiver into thinking it is still properly tracking the DSSS signal.

Prior art methods for detecting jamming includes frequency based analysis of a DSSS signal at the pre-detection stage, for example analyzing the frequency-domain representation of the received signal. This requires extensive use of the Fast Fourier Transform (FFT), which burdens the processor and memory of a receiver as the FFT output over multiple time intervals must be stored during the processing of information. A new method of jamming detection, which can be readily added to an existing receiver with no additional hardware requirement and impose a minimum burden on the processor and memory is desirable.

Accordingly, there is a significant need for an apparatus and method that overcomes the deficiencies of the prior art outlined above.

BRIEF DESCRIPTION OF THE DRAWINGS

Referring to the drawing.

It will be appreciated that for simplicity and clarity of illustration, elements shown in the drawing have not necessarily been drawn to scale. For example, the dimensions of some of the elements are exaggerated relative to each other. Further, where considered appropriate, reference numerals have been repeated among the Figures to indicate corresponding elements.

DESCRIPTION OF THE PREFERRED EMBODIMENTS

In the following detailed description of exemplary embodiments of the invention, reference is made to the accompanying drawings, which illustrate specific exemplary embodiments in which the invention may be practiced. These embodiments are described in sufficient detail to enable those skilled in the art to practice the invention, but other embodiments may be utilized and logical, mechanical, electrical and other changes may be made without departing from the scope of the present invention. The following detailed description is, therefore, not to be taken in a limiting sense, and the scope of the present invention is defined only by the appended claims.

In the following description, numerous specific details are set forth to provide a thorough understanding of the invention. However, it is understood that the invention may be practiced without these specific details. In other instances, well-known circuits, structures and techniques have not been shown in detail in order not to obscure the invention.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical, electrical, or logical contact. However, "coupled" may mean that two or more elements are not in direct contact with each other, but yet still co-operate or interact with each other.

For clarity of explanation, the embodiments of the present invention are presented, in part, as comprising individual functional blocks. The functions represented by these blocks may be provided through the use of either shared or dedicated hardware, including, but not limited to, hardware capable of executing software. The present invention is not limited to implementation by any particular set of elements, and the description herein is merely representational of one embodiment.

Figure 1:
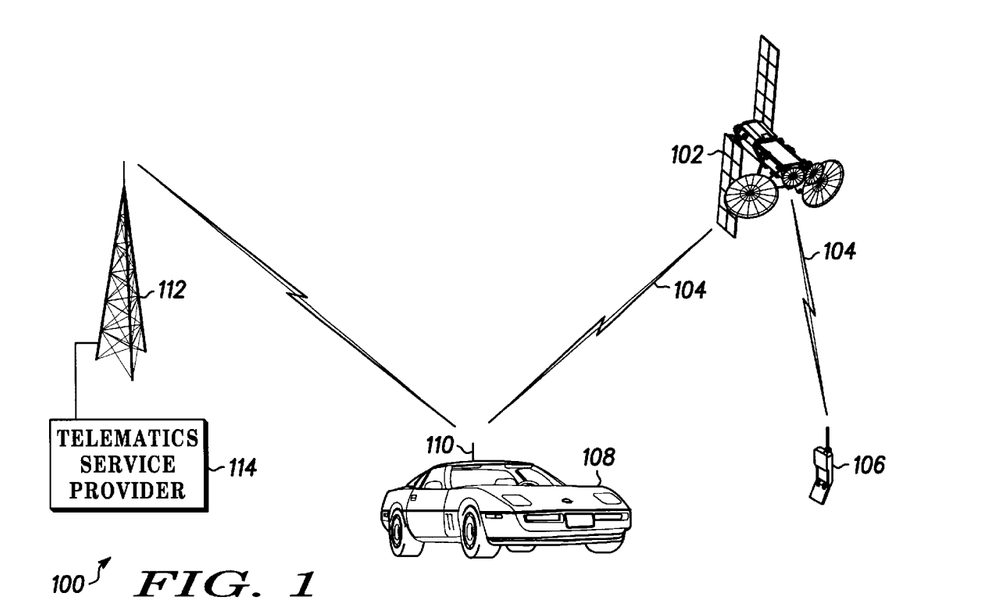
FIG. 1 depicts a system level diagram of a wireless communication network according to an embodiment of the invention.

FIG. 1 depicts a system level diagram of a wireless communication network 100 according to an embodiment of the invention. In particular, a satellite 102 provides wireless communication signals 104 to a wireless communication device 106 or a vehicle 108 by way of a telematics communication unit 110. The satellite 102 could be any communication satellite, such as a satellite for the global positioning system (GPS), which is well known in the art. In an embodiment of the invention, satellite 102 can utilize only DSSS signals. The wireless communication device 106 could be any communication device adapted to receive wireless communication signals 104, such as a portable GPS receiver, or any device incorporating a GPS receiver, such as a cellular telephone having GPS capability. The telematics communication unit 110 preferably is adapted to communicate with another wireless communication network 112, such as a cellular communication network, coupled to a telematics service provider 114.

Figure 2:
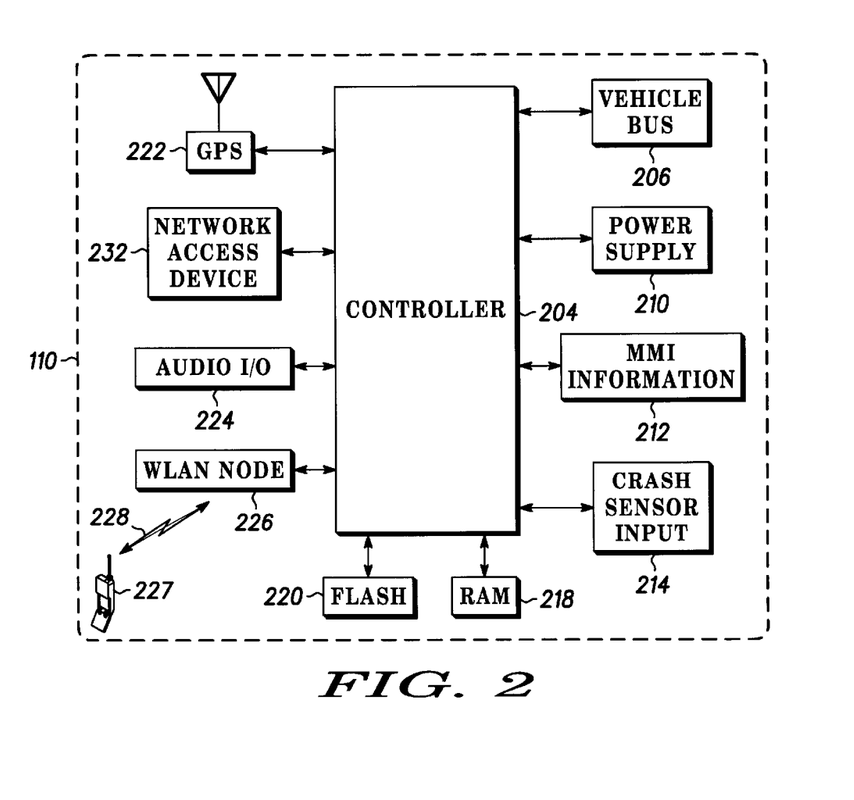
FIG. 2 is a block diagram of a telematics communication unit according to an embodiment of the invention.

FIG. 2 is a block diagram of a telematics communication unit 110 according to an embodiment of the invention. As depicted in FIG. 2, telematics communication unit 110 can be installed in the vehicle 108 of FIG. 1. The telematics communication unit 110 preferably comprises a controller 204 having various input/output (I/O) ports for communicating with various components of a vehicle 108. For example, the controller 204 is coupled to a vehicle bus 206, a power supply 210, a man machine interface (MMI) 212, and a crash sensor input 214. The connection to the vehicle bus 206 enables operations such as unlocking the door, sounding the horn, flashing the lights, etc. The controller 204 is also preferably coupled to various memory elements, such as a random access memory (RAM) 218 or a flash memory 220. The telematics controller 204 also preferably includes a global positioning system (GPS) unit 222 which provides the location of the vehicle, as is well known in the art. The telematics controller 204 is also preferably coupled to an audio I/O 224 which preferably includes a hands-free system for audio communication for a user of the vehicle by way of a wireless communication network, such as a cellular telephone network.

Finally, the telematics communications unit 110 could include a wireless local area network (WLAN) node 226 which is also coupled to the controller 204 and enables communication between a WLAN enabled device such as a wireless communication device 227 and the telematics controller 204. The wireless communication device 227 could communicate with the WLAN enabled controller 204, and therefore, a network access device 232, by any WLAN protocol, such as Bluetooth, IEEE 802.11, IrdA, or any other WLAN application, on a communication link 228. The communication link 228 preferably provides a local, low power connection between the wireless communication device 227 and a network access device 232 of the vehicle. The network access device 232 could be, for example, a cellular telephone transceiver or other two-way wireless communication device which is well known in the art.

Figure 3:
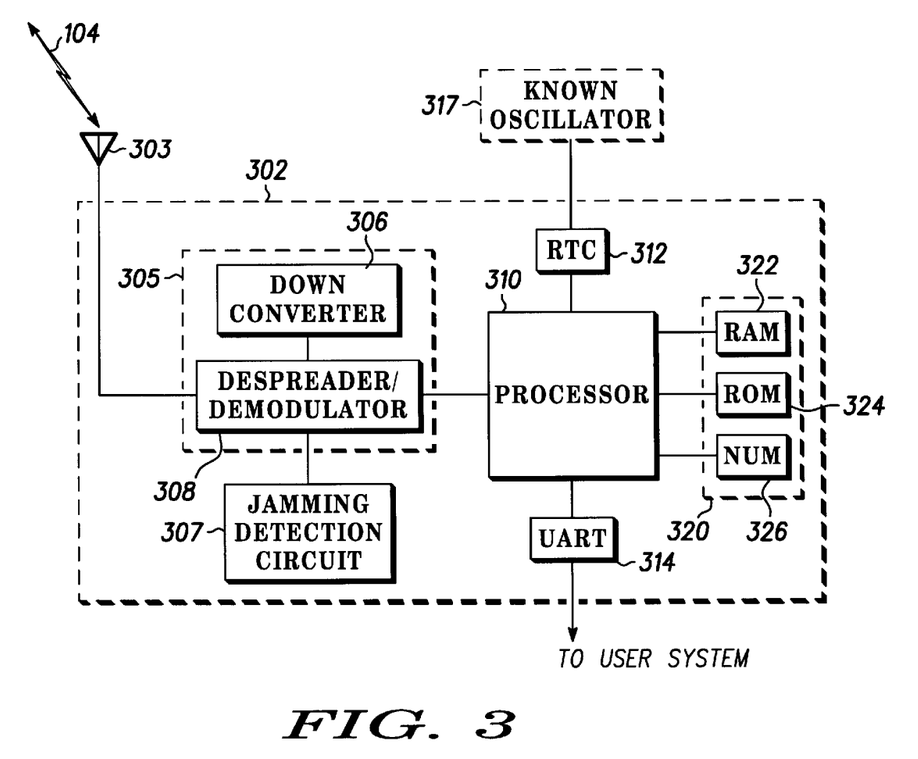
FIG. 3 is a block diagram of a wireless communication receiver according to an embodiment of the invention.

FIG. 3 is a block diagram of a wireless communication receiver 302 according to an embodiment of the invention. Wireless communication receiver 302 can be incorporated in the GPS unit 222 or wireless communication device 106. Wireless communication receiver 302 is coupled to an antenna 303 and a radio frequency (RF) circuit to receive wireless communication signal 104. Wireless communication receiver 302 further comprises a downconverter 306, coupled to a despreader/demodulator 308, as is well known in the art.

In an embodiment of the invention, wireless communication signals 104 can be GPS signals, which are received from GPS satellites, such as the wireless communication signals 104 from the satellite 102 shown in FIG. 1. The despreader/demodulator 308 is coupled to a processor 310. Processor 310 is coupled to a real time clock (RTC) 312 and a universal asynchronous receiver/transmitter (UART) 314 which communicates with a user system. For example, the UART 314 could communicate with a controller of wireless communication device 106, controller 204 of the telematics communication unit 110, or any other device incorporating the receiver 302. The RTC 312 is coupled to a known oscillator 317. Despreader/demodulator 308 is coupled to jamming detection circuit 307, which is discussed more fully below.

Finally, the processor is coupled to a memory portion 320. The memory portion 320 preferably comprises a random access memory (RAM) 322, a read only memory (ROM) 324 and a non-volatile memory (NVM) 326. The elements of receiver 302 could be incorporated on a single integrated circuit (IC), or on multiple IC's. While the known oscillator 317 is shown separate from the receiver 302, the known oscillator 317 could be incorporated on an IC of the receiver 302.

Figure 4:
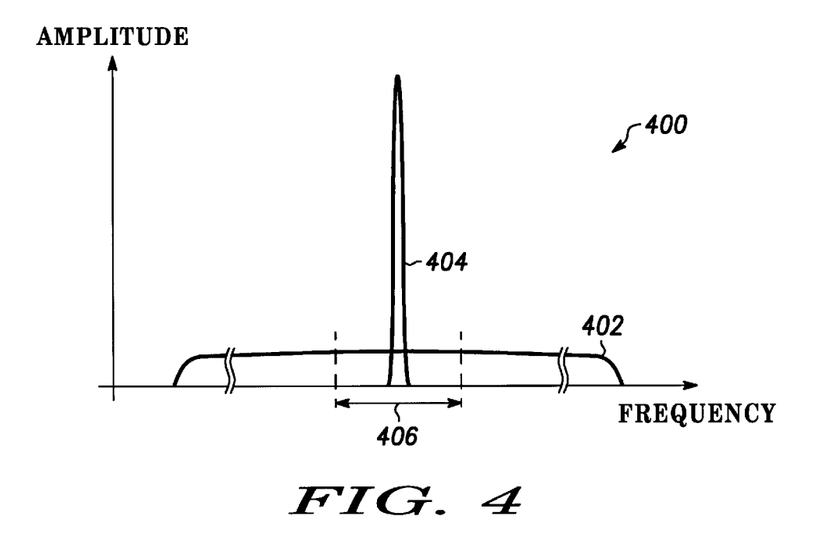
FIG. 4 is a spectral diagram according to an embodiment of the invention.

FIG. 4 is a spectral diagram 400 according to an embodiment of the invention. GPS satellites transmit GPS signals in two frequency bands, conventionally referred to as the L1 band and the L2 band. These are known as the GPS bands. The L1 band has a nominal carrier frequency of 1575.42 MHz, and the L2 band has a nominal carrier frequency of 1227.6 MHz. Due to the relative motion between the satellite and the observer, however, these frequencies may be Doppler shifted up or down by as much as 5 kHz. Most commercial receivers use only the L1 band, as the L2 band is used primarily for military applications.

As shown in FIG. 4, a wireless communication signal 104 into a receiver 302 can be a GPS signal 402, where the receiver 302 has a bandpass filter with a passband 406 to select the desired range of frequencies of GPS signal 402 for further processing. GPS signal 402 is a relatively low-strength signal with a data rate of approximately 50 bits per second (bps) and a chip rate of 1.023 million chips per second (Mchips/sec). If a much stronger narrowband jamming signal 404, for example and without limitation, a continuous wave (CW) signal, occupies the passband 406, the output of the despreader within the despreader/demodulator 308 will always have a high output magnitude, which will cause jamming of the GPS receiver on that channel.

Before the spreading process is done, the signal to be modulated is an M-PSK modulated signal, where M is an integer and corresponds to the number of possible phases, where each phase corresponds to a particular source data symbol. For quadrature phase shifted keyed (QPSK) signals, there are 4 possible phases, which allows for 2-bit symbols. For GPS, for example, the signal is binary phase shift keyed (BPSK), which has two possible phases, which allows for 1-bit symbols. Since the source data to be transmitted varies as a function of time, the phase of the transmitted symbol will change as a function of time also. For example, if a BPSK signal is being properly demodulated by a receiver, there will be 180 degree phase changes occurring at random times due to the random data. If a QPSK signal is being properly demodulated by a receiver, then the phase transitions are defined as phase transitions which are approximately n*(90 degrees) apart, where n is an integer from 1 to 3, which occur at random times. In effect, for a QPSK signal, there are 90-degree phase changes occurring at random times. For a GPS signal with a data rate of 50 bps, there are no more than 50 phase transitions per second, since the source data is not always alternating 1's and 0's. However, given any DSSS signal, there are an expected minimal number of phase transitions during a time interval. The minimum number is dependent upon the data rate and format of the data to be transmitted.

If receiver 302 is tracking a narrowband jamming signal 404 that is relatively high-powered compared to GPS signal 402, there will be a small number, if any, phase transitions during a time interval. For example, if narrowband jamming signal 404 is a CW signal, there are no phase transitions during a time interval. As a result, the number of phase transitions during a time interval can be monitored to determine if a wireless communication signal 104 is a DSSS signal, for example a GPS signal 402, or a narrowband jamming signal 404.

Figure 5:
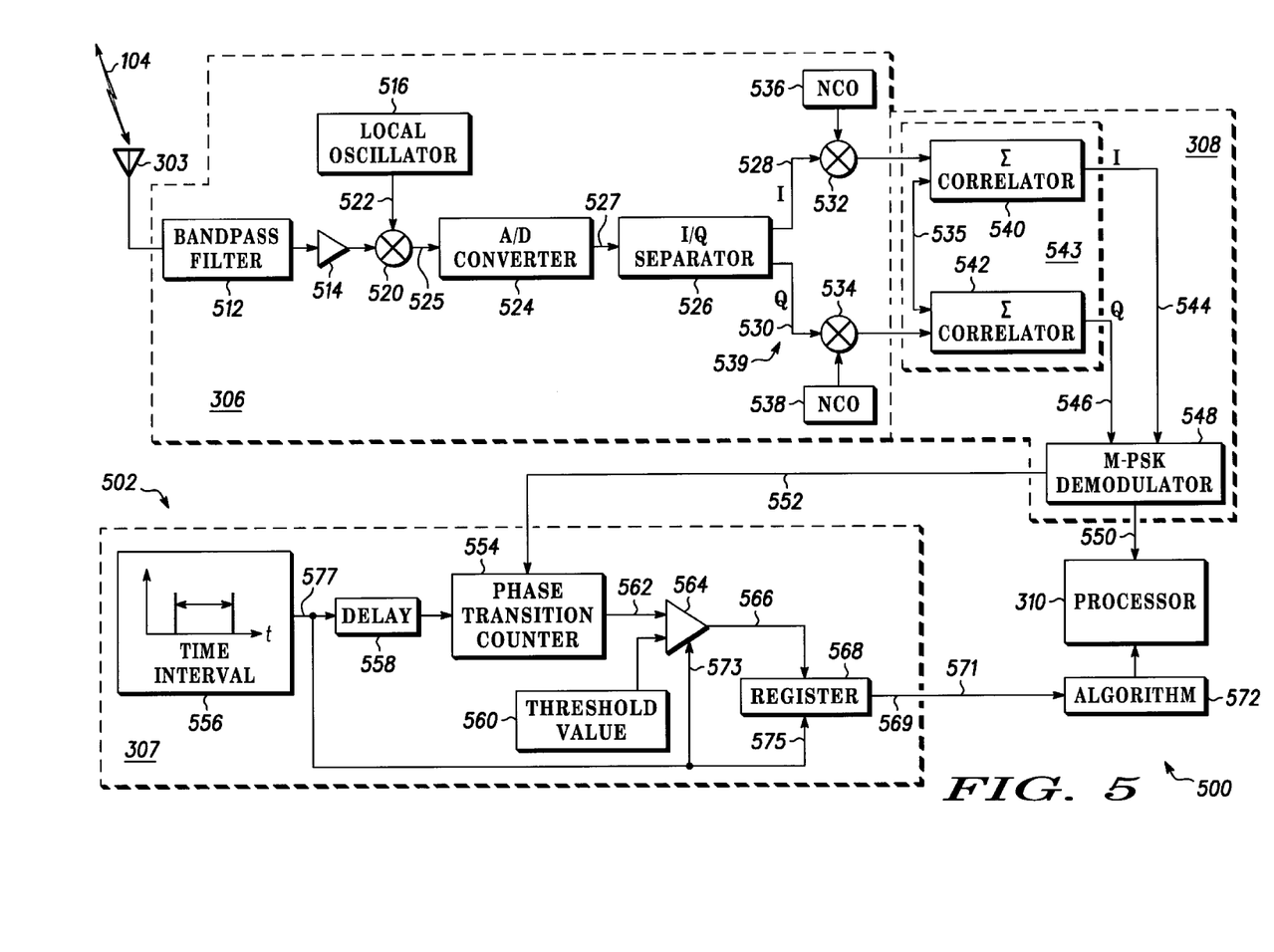
FIG. 5 is more detailed block diagram of a wireless communication receiver according to an embodiment of the invention.

FIG. 5 is more detailed block diagram 500 of a wireless communication receiver 502 according to an embodiment of the invention. As shown in FIG. 5, wireless communication signal 104 is received at antenna 303, which is coupled to downconverter 306. In downconverter 306, wireless communication signal 104 is first processed through bandpass filter 512, which preferentially selects desired frequencies, for example those frequencies associated with a GPS signal 402, e.g. frequencies in the L1 band or L2 band. Bandpass filter 512 is coupled to amplifier 514, which amplifies the signal from bandpass filter 512. Mixer 520 mixes the output of amplifier 514 with local oscillator signal 522 from local oscillator 516. In this way, mixer 520 downconverts the frequency of the output of amplifier 514 to provide an intermediate frequency (IF) signal 525.

Local oscillator 516 can include a frequency synthesizer, which uses a voltage controlled oscillator and a phase locked loop to produce a signal that is phase locked to a reference oscillator. Reference oscillator (not shown for clarity) can be included on the wireless communication device 106 or be provided as an additional receiver or GPS component, in which case it may be either internal or external to the IC of receiver 502. Oscillator is typically a crystal oscillator and may be provided with temperature compensation circuitry.

After initial downconversion, IF signal 525 is converted to digital signal 527 through an analog-to-digital (A/D) converter 524. Thereafter, digital signal 527 is separated via I/Q separator 526 into an in-phase (I) component 528 and a quadrature (Q) component 530 before entering despreader/demodulator 308.

Next, I component 528 and Q component 530 enter a final downconversion process 539. I component 528 enters mixer 532 and is mixed with a signal from numerically controlled oscillator (NCO) 536. Q component 530 enters mixer 534 and is mixed with a signal from NCO 538. The output signal from NCO 538 is essentially a phase-shifted version of the output signal from NCO 536. The NCO 538 output signal is 90 degrees out of phase with respect to NCO 536 output signal.

In this way, bandpass filter 512, amplifier 514, mixer 520, local oscillator 516, and final downconversion process 539comprise downconverter 306 section of receiver 502. Downconverter 306 operates to filter out, amplify, and reduce the carrier frequencies of wireless communication signals 104, for example GPS signal 402, received by receiver 502. In an embodiment, wireless communication signal 104 is a GPS signal 402 from a particular satellite 102 that typically appears in a band of frequencies with a carrier frequency of 1575.42 MHz (the nominal L1 carrier frequency) shifted by a Doppler frequency primarily caused by the satellite's motion relative to receiver 502 and oscillator drift. The corresponding GPS signal 402 after downconversion to IF signal 525 will appear in a second band of frequencies with a much lower carrier frequency. Specifically, the carrier frequency of the IF signal 525 will be the carrier frequency of the output of amplifier 514 shifted by an amount determined by the frequency of local oscillator signal 522.

Although a particular exemplary embodiment of downconverter 306 is shown in FIG. 5, other implementations can also be used and be within the scope of the invention. For example, while downconverter 306 is shown as having one amplifier, one bandpass filter and one mixer, a greater number of amplifiers, bandpass filters and amplifiers can be used and be within the scope of the invention.

Output of mixer 520 is converted to digital signal 527 by A/D converter 524. Digital signal 527 enters the I/Q separator 526. Signal I 528 and signal Q 530 enter the final downconversion process 539. The outputs of this process enter despreader/demodulator 308, which is comprised of despreader 543 and M-PSK demodulator 548. Despreader 543 comprises correlators 540, 542. Output of mixer 532 and pseudo-random noise (PN) code 535 are coupled to correlator 540, which generates an I component output 544. Output of mixer 534 is also coupled with PN code 535 to correlator 542, which generates a Q component output 546. In an embodiment of the invention, GPS for example, the PN code 535 is a Gold code at a rate of 1.023 Mchips per second.

I component output 544 and Q component output 546 are coupled to M-PSK demodulator 548, where the signal sampling rate is reduced from approximately 1/(predetection interval of correlators 540 & 542) to 50 Hz. In the present embodiment, the sampling rate is reduced from 1 kHz to 50 Hz. However, other reductions in sampling rate are within the scope of the invention. The M-PSK demodulator 548 keeps track of the phase of demodulated signal 552 and outputs it to phase transition counter 554 of jamming detection circuit 307. Phase of demodulated signal 552 can include phase information of demodulated signal, for example the actual phase of demodulated signal 552, the change in phase of demodulated signal 552, and the like. Demodulated signal 550 output by M-PSK demodulator 548, for example GPS bit-stream data, and the like, is sent to processor 310 for use in receiver 502 and wireless communication device 106. By combining data from at least four GPS satellites via four GPS channels, receiver 502 is able to compute its three-dimensional location and to determine the correct time. GPS receivers may obtain this information from multiple satellites by acquiring and tracking signals from several different GPS satellites in succession. However, many GPS receivers are provided with multiple signal processing channels, with each channel corresponding to a particular GPS satellite, so that the GPS can process GPS signals from several GPS satellites at once. In another embodiment of the invention, phase of demodulated signal 552 can originate from demodulated signal 550 with the change in phase of demodulated signal 550 computed and sent to phase transition counter 554.

In an embodiment of the invention, phase transition counter 554 receives the phase of demodulated signal 552 as described above. Phase transition counter 554 increments the count whenever the phase of demodulated signal 552 changes. For example, if a BPSK signal is being properly demodulated by a receiver 502, there will be approximately 180-degree phase changes occurring at random times, with phase transition counter 554 incrementing for each phase change. If a QPSK signal is being properly demodulated by a receiver, then the phase transitions are defined as phase transitions which are approximately n*(90 degrees) apart, where n is an integer from 1 to 3, which occur at random times. In effect, for a QPSK signal, there are 90-degree phase changes occurring at random times, with phase transition counter 554 incrementing for each phase change.

Number of phase transitions 562 are counted by phase transition counter 554 during time interval 556 and output to comparator 564. At the end of each time interval 556, the number of phase transitions 562 during time interval 556 is compared to threshold value 560 via comparator 564. Time interval 556 can be any convenient time interval, for example, 1 second.

In an embodiment of the invention, threshold value 560 should be smaller than the nominal data bit rate for a particular DSSS system. As an example of an embodiment, a GPS signal has a nominal data bit rate of 50 bps, meaning there are no more than 50 phase transitions per second, since the source data is usually not alternating 1's and 0's. Therefore, for a receiver 502 designed to process a GPS signal 402, threshold value 560 should be less than 50 phase transitions per second. In a preferred embodiment of the invention, threshold value 560 should be no more than 10% of the nominal data bit rate so as to avoid false indications that wireless communication signal 104 is a narrowband jamming signal 404. In this particular embodiment, for a 50 bps GPS signal, threshold value 560 should be set at no more than 5 phase transitions per second. This example is not limiting of the invention, and any threshold value 560 is within the scope of the invention.

In an embodiment of the invention, the output of comparator 566 is stored, for example, in register 568 so as to preserve the output of comparator 566 after phase transition counter 554 is reset to zero for the next time interval 556. In an embodiment of the invention, output of comparator 566 is either a pass condition 569 or a fail condition 571. Pass condition 569 occurs when the number of phase transitions 562 during time interval 556 exceeds threshold value 560. This validates wireless communication signal 104 by determining that wireless communication signal 104 is, for example, a desirous DSSS signal, GPS signal, and the like. Fail condition 571 occurs when the number of phase transitions 562 during time interval 556 is less than threshold value 560. This invalidates wireless communication signal 104 by determining that wireless communication signal 104 is a narrowband jamming signal 404.

At the end of each time interval 556, signals are sent to reset elements of jamming detection circuit 307 and to initiate the number of phase transitions 562 comparison by comparator 564. Signal 577 is sent to phase transition counter 554 to reset the number of phase transitions 562 to zero. Delay 558 is included for signal 577 to ensure that phase transition counter 554 outputs number of phase transitions 562 to comparator prior to being reset. Signal 573 is sent to initiate comparison by comparator of number of phase transitions 562 accumulated by phase transition counter 554 during time interval 556, with threshold value 560. Signal 575 indicates that register 568 is to poll comparator output 566.

In an embodiment of the invention, register 568 stores and outputs a record of each of pass condition 569 and fail condition 571. Each of these pass condition 569 and fail condition 571 can be communicated to an algorithm 572, which can use the results of jamming detection circuit 307 to take appropriate action in conjunction with processor 310 of receiver 502. For example, in a GPS system, if wireless communication signal 104 is validated and therefore determined to be a GPS signal 402 and not a narrowband jamming signal 404, then the GPS channel (e.g. L1 band) corresponding to wireless communication signal 104 can be included in a GPS position, time, velocity (PVT) solution. If wireless communication signal 104 is invalidated and therefore determined to be a narrowband jamming signal 404, one or more actions can be taken by algorithm 572. In one embodiment, GPS channel corresponding to wireless communication signal 104 can be reinitialized and an attempt made to reacquire wireless communication signal 104 over the corresponding GPS channel. In another embodiment, GPS channel corresponding to wireless communication signal 104 can be excluded from the GPS PVT solution without channel reinitialization. In still another embodiment, fail condition 571 can be crosschecked against another jamming signal detection method for verification.

Figure 6:
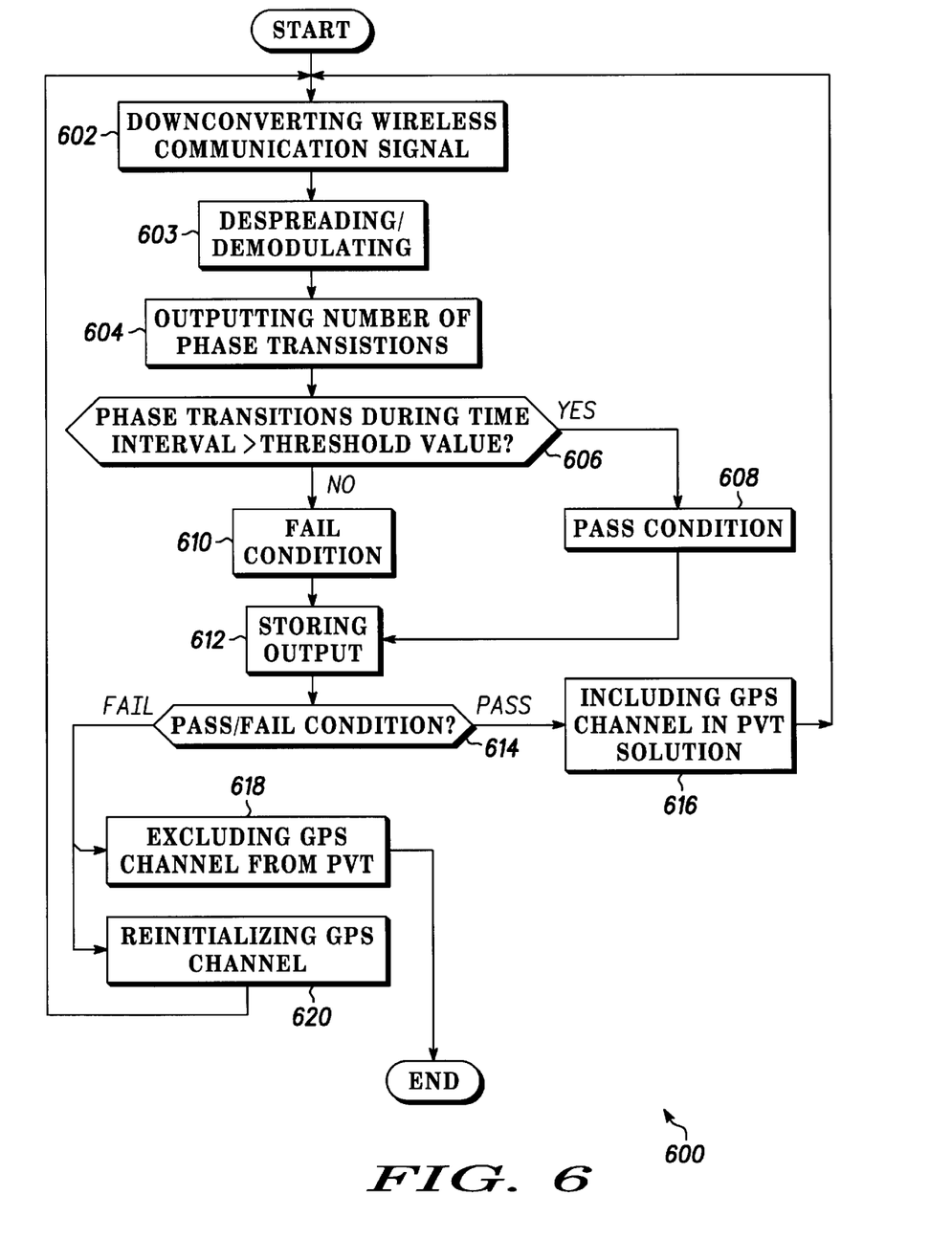
FIG. 6 is flow chart of a method according to an embodiment of the invention.

FIG. 6 is flow chart 600 of a method according to an embodiment of the invention. In step 602, wireless communication signal 104 is downconverted to an IF signal 525, which is then digitized to a digital signal 527 using A/D converter 524. Also in step 602, digital signal 527 can be separated into I and Q components by I/Q separator 526, which are then downconverted by final downconversion process 539. In step 603, the I & Q outputs of the downconversion process 539 pass through despreader/demodulator 308 as described above. In step 604, the phase of demodulated signal 552 is output from despreader/demodulator 308 to phase transition counter 554. In an embodiment of the invention, the phase of demodulated signal 552 is output from M-PSK demodulator 548. Phase transition counter 554 counts the number of phase transitions 562 during time interval 556. In step 606 it is determined if the number of phase transitions 562 during time interval 556 exceeds threshold value 560. If so, a pass condition 569 is recorded per step 608 with pass condition 569 being stored per step 612. If not, a fail condition 571 is recorded per step 610 and stored per step 612. As discussed above, pass condition 569 validates wireless communication signal 104 as not being a narrowband jamming signal 404 and as being a desirous DSSS signal, GPS signal, and the like. A fail condition 571 invalidates wireless communication signal 104 and indicates that wireless communication signal 104 can be a narrowband jamming signal 404.

In step 614 it is determined if a pass condition 569 or a fail condition 571 is indicated by jamming detection circuit 307. If a pass condition 569 is indicated, GPS channel corresponding to wireless communication signal 104 is included in a GPS PVT solution per step 616, and wireless communication signal 104 continues to be tested by jamming detection circuit 307 as indicated by the return arrow from step 616.

If a fail condition 571 is indicated, one or more actions can be taken as indicated by steps 618 and 620. In step 618, GPS channel corresponding to wireless communication signal 104 can be excluded from a GPS PVT solution. In step 620, GPS channel corresponding to wireless communication signal 104 can be reinitialized and an attempt made to reacquire wireless communication signal 104 over the corresponding GPS channel.

Figure 7:
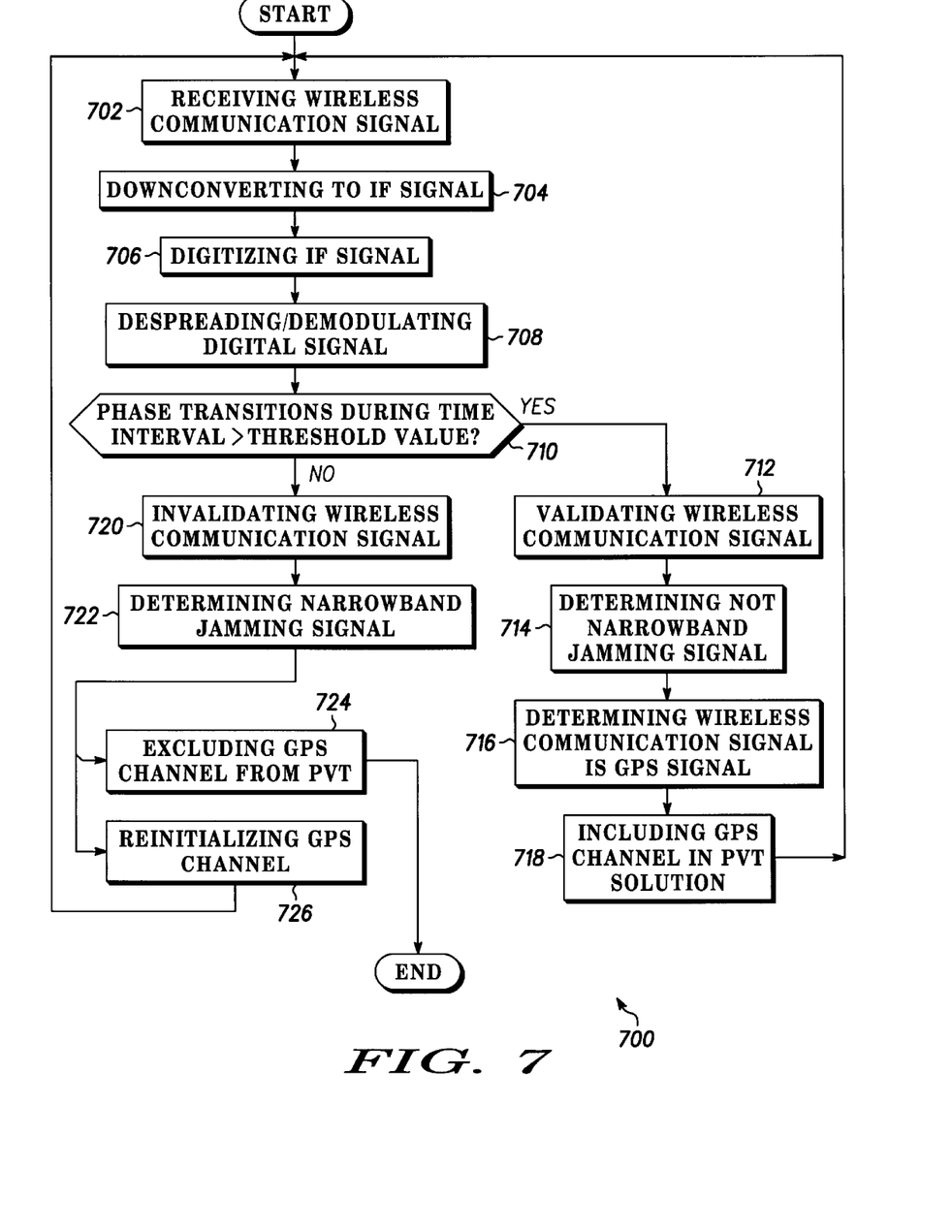
FIG. 7 is a flow chart of another method according to an embodiment of the invention.

FIG. 7 is a flow chart 700 of another method according to an embodiment of the invention. In step 702, receiver 502 receives wireless communication signal 104. In step 704, wireless communication signal 104 is downconverted to IF signal 525 by bandpass filter 512, amplifier 514 and mixer 520 as described above. In step 706 IF signal 525 is digitized to digital signal 527 by A/D converter 524, separated into I and Q components by I/Q separator 526 and passed through final downconversion process 539. In step 708, digital signal 527 is despread and demodulated by despreader/demodulator 308 as described above to provide demodulated signal 550 and phase of demodulated signal 552. In step 710, it is determined if the number of phase transitions 562 of phase of demodulated signal 552 during time interval 556 exceeds threshold value 560. If so, wireless communication signal 104 is validated per step 712 and determined not to be narrowband jamming signal 404 per step 714. In step 716 it is determined that wireless communication signal 104 is a GPS signal 402. In step 718, GPS channel corresponding to wireless communication signal 104 is included in GPS PVT solution.

If the number of phase transitions 562 during time interval 556 is less than threshold value 560 in step 710, then wireless communication signal 104 is invalidated per step 720 and it is determined that wireless communication signal is a narrowband jamming signal 404 per step 722. In this case one or more actions can be taken as indicated by steps 724 and 726. In step 724, GPS channel corresponding to wireless communication signal 104 can be excluded from a GPS PVT solution. In step 726, GPS channel corresponding to wireless communication signal 104 can be reinitialized and an attempt made to reacquire wireless communication signal 104 over the corresponding GPS channel.

While we have shown and described specific embodiments of the present invention, further modifications and improvements will occur to those skilled in the art. It is therefore, to be understood that appended claims are intended to cover all such modifications and changes as fall within the true spirit and scope of the invention.

What is claimed is:

1. In a wireless communication device, a method of validating a wireless communication signal, comprising:

receiving a wireless communication signal;

downconverting the wireless communication signal to an intermediate frequency (IF) signal;

digitizing the IF signal to provide a digital signal;

despreading and demodulating the digital signal to provide a phase of demodulated signal;

for the phase of demodulated signal, monitoring a number of phase transitions during a time interval;

comparing the number of phase transitions during the time interval with a threshold value;

validating the wireless communication signal if the number of phase transitions during the time interval exceeds the threshold value; and invalidating the wireless communication signal if the number of phase transitions during the time interval is less than the threshold value.

2. The method of claim 1, wherein the wireless communication signal is a GPS signal.

3. The method of claim 1, wherein invalidating the wireless communication signal comprises determining that the wireless communication signal is a narrowband jamming signal.

4. The method of claim 3, wherein invalidating the wireless communication signal comprises reinitializing a GPS channel corresponding to the wireless communication signal.

5. The method of claim 3, wherein invalidating the wireless communication signal comprises excluding a GPS channel corresponding to the wireless communication signal from a position, velocity, time (PVT) solution.

6. The method of claim 1, wherein validating the wireless communication signal comprises determining that the wireless communication signal is a GPS signal.

7. The method of claim 6, wherein validating the wireless communication signal comprises including a GPS channel corresponding to the wireless communication signal in a position, time, velocity (PVT) solution.

8. In a wireless communication device, a method of detecting a narrowband jamming signal comprising:

receiving a wireless communication signal;

downconverting the wireless communication signal to an intermediate frequency (IF) signal;

digitizing the IF signal to provide a digital signal;

despreading and demodulating the digital signal to provide a phase of demodulated signal;

for the phase of demodulated signal, monitoring a number of phase transitions during a time interval;

comparing the number of phase transitions during the time interval with a threshold value;

determining that the wireless communication signal is not the narrowband jamming signal if the number of phase transitions during the time interval exceeds the threshold value; and determining that the wireless communication signal is the narrowband jamming signal if the number of phase transitions during the time interval is less than the threshold value.

9. The method of claim 8, wherein determining that the wireless communication signal is not the narrowband jamming signal comprises determining that the wireless communication signal is a GPS signal.

10. The method of claim 9, wherein determining that the wireless communication signal is not the narrowband jamming signal comprises including a GPS channel corresponding to the wireless communication signal in a position, time, velocity (PVT) solution.

11. The method of claim 8, wherein determining that the wireless communication signal is the narrowband jamming signal comprises reinitializing a GPS channel corresponding to the wireless communication signal.

12. The method of claim 8, wherein determining that wireless communication signal is the narrowband jamming signal comprises excluding a GPS channel corresponding to the wireless communication signal from a position, velocity, time (PVT) solution.

13. In a wireless communication device, a method of monitoring a GPS channel for a narrowband jamming signal comprising:

receiving a wireless communication signal on the GPS channel;

downconverting the wireless communication signal to an intermediate frequency (IF) signal;

digitizing the IF signal to provide a digital signal;

despreading and demodulating the digital signal to provide a phase of demodulated signal;

for the phase of demodulated signal, monitoring a number of phase transitions during a time interval;

comparing the number of phase transitions during the time interval with a threshold value;

determining that the-wireless communication signal is not the narrowband jamming signal if the number of phase transitions during the time interval exceeds the threshold value; and determining that the wireless communication signal is the narrowband jamming signal if the number of phase transitions during the time interval is less than the threshold value.

14. The method of claim 13, wherein if the wireless communication signal is the narrowband jamming signal, further comprising reinitializing the GPS channel.

15. The method of claim 13, wherein if the wireless communication signal is the narrowband jamming signal, further comprising excluding the GPS channel from a position, velocity, time (PVT) solution.

16. The method of claim 13, wherein if the wireless communication signal is not the narrowband jamming signal, including the GPS channel in a position, time, velocity (PVT) solution.

17. In a wireless communication device, a computer-readable medium containing computer instructions for instructing a processor to perform a method of detecting a narrowband jamming signal, the instructions comprising:

receiving a wireless communication signal;

downconverting the wireless communication signal to an intermediate frequency (IF) signal;

digitizing the IF signal to provide a digital signal;

despreading and demodulating the digital signal to provide a phase of demodulated signal;

for the phase of demodulated signal, monitoring a number of phase transitions during a time interval;

comparing the number of phase transitions during the time interval with a threshold value;

determining that the wireless communication signal is not the narrowband jamming signal if the number of phase transitions during the time interval exceeds the threshold value; and determining that the wireless communication signal is the narrowband jamming signal if the number of phase transitions during the time interval is less than the threshold value.

18. The computer-readable medium of claim 17, wherein determining that the wireless communication signal is not the narrowband jamming signal comprises determining that the wireless communication signal is a GPS signal.

19. The computer-readable medium of claim 18, wherein determining that the wireless communication signal is not the narrowband jamming signal comprises including a GPS channel corresponding to the wireless communication signal in a position, time velocity (PVT) solution.

20. The computer-readable medium of claim 17, wherein determining that the wireless communication signal is the narrowband jamming signal comprises reinitializing a GPS channel corresponding to the wireless communication signal.

21. The computer-readable medium of claim 17, wherein determining that wireless communication signal is the narrowband jamming signal comprises excluding a GPS channel corresponding to the wireless communication signal from a position, velocity, time (PVT) solution.

22. A receiver for a wireless communication device, comprising:
    a downconverter for downconverting a wireless communication signal and transforming the wireless communication signal to a digital signal;
    a despreader/demodulator coupled to the downconverter for converting the digital signal to a demodulated signal and outputting a phase of the demodulated signal;
    a phase transition counter coupled for receiving the phase of the demodulated signal and counting a number of phase transitions during a time interval;
    a comparator coupled for comparing the number of phase transitions during the time interval with a threshold value, wherein if the number of transitions during the time interval exceeds the threshold value the wireless communication signal is a GPS signal, which indicates a pass condition, wherein if the number of transitions during the time interval is less than the threshold value the wireless communication signal is a narrowband jamming signal, which indicates a fail condition, and wherein one of the pass condition and the fail condition is an output of the comparator; and
    a means for storing an output of the comparator.

23. The receiver of claim 22, further comprising an algorithm for utilizing the output of the comparator, wherein if the wireless communication signal is the GPS signal, the algorithm includes a GPS channel corresponding to the wireless communication signal in a position, time, velocity (PVT) solution.

24. The receiver of claim 22, further comprising an algorithm for utilizing the output of the comparator, wherein if the wireless communication signal is the narrowband jamming signal, the algorithm reinitializes a GPS channel corresponding to the wireless communication signal.

25. The receiver of claim 22, further comprising an algorithm for utilizing the output of the comparator, wherein if the wireless communication signal is the narrowband jamming signal, the algorithm excludes a GPS channel corresponding to the wireless communication signal from a position, velocity, time (PVT) solution.

26. A receiver for a wireless communication device, comprising:
    a means for downconverting a wireless communication signal and transforming the wireless communication signal to a demodulated signal;
    a means for outputting a number of phase transitions during a time interval for the demodulated signal;
    a means for counting the number of phase transitions during the time interval;
    a means for comparing the number of phase transitions during the time interval with a threshold value, wherein if the number of transitions per the time interval exceeds the threshold value the wireless communication signal is a GPS signal, which indicates a pass condition, wherein if the number of transitions per the time interval is less than the threshold value the wireless communication signal is a narrowband jamming signal, which indicates a fail condition, and wherein one of the pass condition and the fail condition is an output of the comparator; and
    a means for storing an output of the comparator.

27. The receiver of claim 26, further comprising a means for utilizing the output of the comparator, wherein if the wireless communication signal is the GPS signal, the means for utilizing the output operates to includes a GPS channel corresponding to the wireless communication signal in a position, time, velocity (PVT) solution.

28. The receiver of claim 26, further comprising a means for utilizing the output of the comparator, wherein if the wireless communication signal is the narrowband jamming signal, the means for utilizing the output operates to reinitializes a GPS channel corresponding to the wireless communication signal.

29. The receiver of claim 26, further comprising a means for utilizing the output of the comparator, wherein if the wireless communication signal is the narrowband jamming signal, the means for utilizing the output operates to excludes a GPS channel corresponding to the wireless communication signal from a position, velocity, time (PVT) solution.

* * * * *